UNITED STATES PATENT OFFICE 2,373,689

PROCESS OF PRODUCING AND UTILIZING GUAYULE RUBBER

Paul Kenda, San Antonio, Tex.

No Drawing. Application April 7, 1942,
Serial No. 437,926

1 Claim. (Cl. 260—816)

(Granted under the act of March 3, 1883, as amended April 30, 1928; 370 O. G. 757)

The invention described herein may be manufactured and used by or for the Government for governmental purposes, without payment to me of any royalty thereon.

This invention relates to a process for manufacturing guayule rubber and more particularly to an improvement in the method of rubber recovery disclosed in United States Letters Patent No. 1,695,676, granted December 18, 1928, to William H. Yeandle.

It is the object of this invention to provide a method of manufacturing guayule rubber which will be simple and inexpensive to employ and which will greatly reduce the time and apparatus that is required to produce such rubber under present day practice.

I have discovered that for certain usages it is unnecessary to agglomerate the exploded rubber particles and that a satisfactory product may be obtained by regrinding the exploded rubber with the pulp.

The product so produced will be added later to pure crude rubber in different percentages as may be required for different articles to be manufactured from it. For instance, a battery casing will take a smaller percentage of this material than would be necessary for a rubber mat for an automobile. Similarly, it would require a still smaller percentage of this material for a rubber tire.

In carrying out my process I prefer to grind the guayule plant immediately upon being brought in from the field while the latex is still fresh, by cutting the shrub into small pieces and subjecting it to the action of flint pebbles in a pebble mill. The pulp thus produced is placed in a revolving cylinder connected with a steam boiler, the water of which is charged to approximately a 5% solution with a coagulant such as acetic acid.

The steam pressure is gradually raised to substantially 175 pounds per square inch and suddenly released. This sudden release in pressure disintegrates the pulp and releases the rubber from the pulp. The processed material thus produced, including both the pulp and the released rubber, is dried to a paste without agglomeration. The paste is then subjected to further grinding until a smooth homogeneous mass results. The product thus achieved forms a satisfactory rubber substitute for many applications and by the addition of varying amounts of pure crude rubber or reclaimed rubber can be adapted to any purpose for which the pure rubber is used without substantial loss of efficiency.

While I have described my invention with particularity, it is to be understood that I do not wish to be limited to the details disclosed since various modifications within the spirit of the invention will suggest themselves to those skilled in the art.

Having described my invention, what I claim as new and wish to secure by Letters Patent is:

A method of preparing a filler composition comprising rubber and a cellulose filler from guayule plants, said composition being adapted for compounding with rubber and rubber-like materials, consisting of cutting the plant into small pieces, grinding the pieces in a pebble mill while the latex is fresh to reduce said pieces to a pulp, digesting said pulp with steam and acetic acid in a revolving cylinder, increasing the steam pressure in said cylinder to about 175 lbs. per square inch releasing the pressure of said steam substantially instantaneously to explode the cells of said plant and intermingle the latex with the cellulose fibers, drying the mixture of latex and cellulose fibers to form a paste and grinding said paste to form a smooth homogeneous mass.

PAUL KENDA.